US010157285B2

(12) United States Patent
Scot et al.

(10) Patent No.: US 10,157,285 B2
(45) Date of Patent: Dec. 18, 2018

(54) DYNAMIC REQUIREMENTS MAPPING

(71) Applicant: Bank of America Corporation, Charlotte, NC (US)

(72) Inventors: Richard Scot, Huntersville, NC (US); Kesha Hamilton, Cedar Hill, TX (US); Jason Greeter, Charlotte, NC (US); Terry G. McConnell, Oak Park, CA (US)

(73) Assignee: Bank of America Corporation, Charlotte, NC (US)

( * ) Notice: Subject to any disclaimer, the term of this patent is extended or adjusted under 35 U.S.C. 154(b) by 130 days.

(21) Appl. No.: 15/293,941

(22) Filed: Oct. 14, 2016

(65) Prior Publication Data

US 2018/0107827 A1    Apr. 19, 2018

(51) Int. Cl.
*G06F 17/30* (2006.01)
*G06F 21/60* (2013.01)

(52) U.S. Cl.
CPC ...... *G06F 21/604* (2013.01); *G06F 17/30312* (2013.01)

(58) Field of Classification Search
CPC .......................... G06F 21/604; G06F 17/30312
USPC ............................................................ 726/1
See application file for complete search history.

(56) References Cited

U.S. PATENT DOCUMENTS

| 7,752,562 | B2 | 7/2010 | Mohanty et al. |
| 8,256,004 | B1 | 8/2012 | Hill et al. |
| 8,713,461 | B2 | 4/2014 | Mohanty et al. |
| 8,812,343 | B2 | 8/2014 | Miller et al. |
| 9,177,279 | B2 | 11/2015 | Miller et al. |
| 9,294,498 | B1 | 3/2016 | Yampolskiy et al. |
| 9,306,965 | B1 | 4/2016 | Grossman et al. |
| 2006/0026197 | A1* | 2/2006 | Quinn ............... G06K 17/00 |
| 2015/0149240 | A1 | 5/2015 | Madiraju et al. |
| 2015/0281287 | A1 | 10/2015 | Gill et al. |
| 2016/0171415 | A1 | 6/2016 | Yampolskiy et al. |

* cited by examiner

*Primary Examiner* — Eleni A Shiferaw
*Assistant Examiner* — Angela R Holmes
(74) *Attorney, Agent, or Firm* — Banner & Witcoff, Ltd.; Michael A. Springs

(57) ABSTRACT

Systems and arrangements for integrating two or more overlapping requirements from different assessments are presented. In some examples, determining whether requirements are considered overlapping may include identifying a plurality of aspects of each requirement and comparing the aspects to aspects of other requirements to determine whether at least a threshold number of aspects are the same. Upon identifying two or more overlapping requirements, the system may integrate the two or more overlapping requirements into an integrated requirement. A unique identifier may be generated for the integrated requirement and associated with the integrated requirement. Data may be received responsive to a request for data for an integrated requirement and the system may associate the received data with the integrated requirement and may map the received data to the two or more requirements integrated into the integrated requirement.

15 Claims, 12 Drawing Sheets

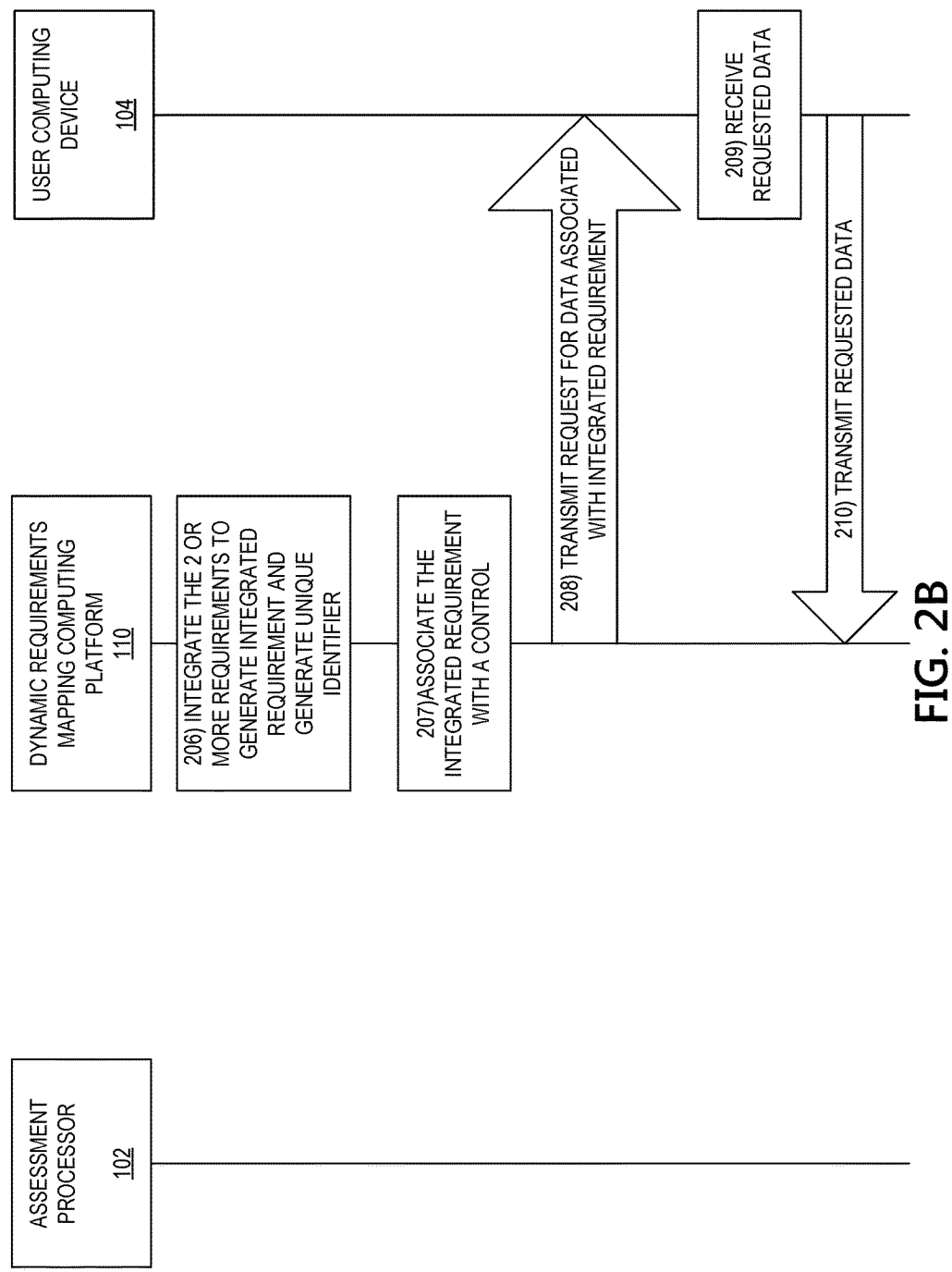

INTEGRATED REQUIREMENT XXXYYYXXXYYY

INCLUDES:
REQUIREMENT 1
REQUIREMENT 2
REQUIREMENT 7
REQUIREMENT 23

EVIDENCE PROVIDED: MM/DD/YYYY

ATTACHMENT: AAABBB.CCC

EVIDENCE PROVIDED BY: LAST NAME, FIRST NAME

| CANCEL | OK |

DYNAMIC REQUIREMENTS MAPPING

BACKGROUND

Aspects of the disclosure relate to computer hardware and software. In particular, one or more aspects of the disclosure generally relate to computer hardware and software for integrating overlapping requirements of different assessments and mapping received information to the requirements via the integrated requirement.

Various industries have different assessments that are completed to evaluate performance in different areas of a business. For instance, some industries may have one or more regulatory assessments to ensure they are meeting various regulatory requirements. In another example, industries may have one or more cybersecurity assessments in order to evaluate cybersecurity of the entity completing the assessment. In some industries, these assessments can be numerous and each one may include hundreds of questions or requirements (e.g., requests for information, and the like). Accordingly, completing the assessments can be a time consuming and inefficient task that can take multiple people months to complete.

In addition, many assessments include requirements that are similar to requirements of other assessments. Accordingly, completing multiple assessments may involve providing duplicate information to one or more different assessments. This adds to the time consuming nature of the task and can lead to errors or inconsistencies in the responses provided to similar requirements in different assessments. Accordingly, it would be advantageous to reduce the man hours involved in completing the assessments and ensure accuracy and consistency in responses provided.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems and arrangements that receive a plurality of assessments and evaluate the assessments to identify a plurality of requirements in each assessment. The requirements may then be evaluated to determine whether two or more requirements from two or more different assessments are considered overlapping. In some examples, determining whether requirements are considered overlapping may include identifying a plurality of aspects of each requirement and comparing the aspects to aspects of other requirements to determine whether at least a threshold number of aspects are the same.

Upon identifying two or more overlapping requirements, the system may integrate the two or more overlapping requirements into an integrated requirement. A unique identifier may be generated for the integrated requirement and associated with the integrated requirement.

In some arrangements, data may be received responsive to a request for data for an integrated requirement. Upon receiving the data, the system may associate the received data with the integrated requirement and may map the received data to the two or more requirements integrated into the integrated requirement. Mapping the data to the two or more requirements may include populating each requirement in its respective assessment with the data in order to complete the assessment or portion thereof.

In some examples, modifications to one requirement of an integrated requirement may be made to the integrated requirement and mapped to other requirements within the integrated requirement. In still other arrangements, data received that may be in conflict with data previous received may cause a notification to be generated and transmitted to a third party user (e.g., a user not associated with the integrated requirement or any of the requirements therein).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence dynamic requirements mapping according to one or more aspects described herein.

FIG. 8 illustrates one example user interface providing information associated with an integrated requirement according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities often have one or more assessments that must be completed on a periodic or as-requested basis. The assessments may be based on an industry of which the entity is a part, may be internally requested (e.g., from a supervising entity, or the like), may be requested by a regulatory agency (e.g., a government agency), or the like. Each assessment may include a plurality of requirements which may include requests for information, requests for data or evidence to support other information, and the like. Assessments can often include hundreds of requirements and, as such, completing the assessments can be time consuming and inefficient.

Various arrangements discussed herein provide for integrating two or more requirements from different assessments into an integrated requirement. The integrated requirement may then be used to receive data responsive to the integrated requirement and that information may be mapped to the two or more requirements integrated into the integrated requirement. Accordingly, the number of responses to requirements may be greatly reduced, thereby conserving computing resources required to complete the assessments, and greater consistency between responses to requirements may be provided.

These and various other arrangements will be discussed more fully herein.

Figure 1:
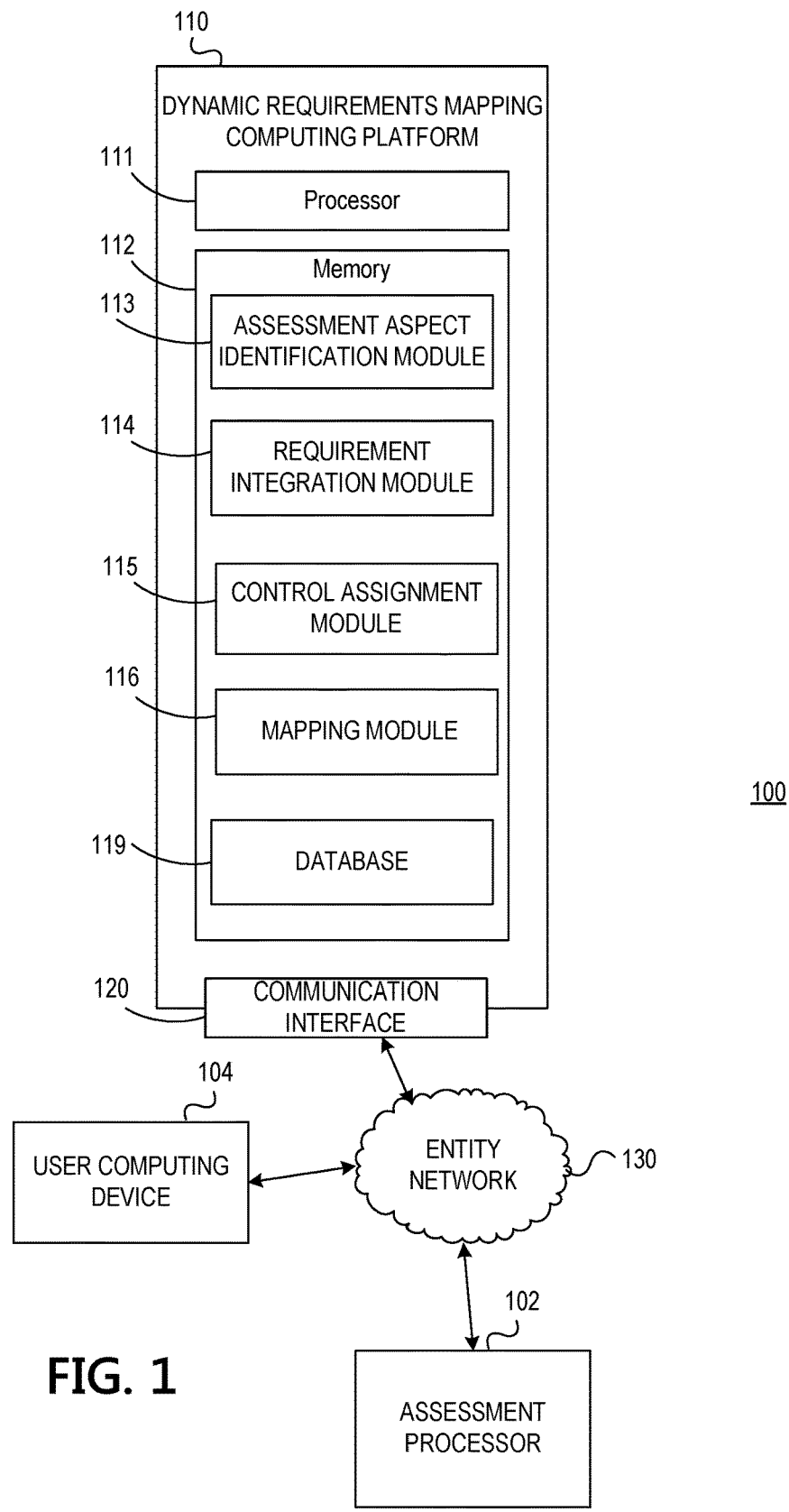
FIG. 1 depicts an illustrative dynamic requirements mapping computing platform according to one or more aspects described herein.

FIG. 1 depicts an environment 100 including an illustrative computing platform for dynamically mapping requirements according to one or more aspects described herein. For instance, the environment 100 includes a dynamic requirements mapping computing platform 110, which may include one or more processors 111, memory 112, and communication interface 120. A data bus may interconnect processor(s) 111, memory 112, and communication interface 120. Communication interface 120 may be a network interface configured to support communication between dynamic requirements mapping computing platform 110 and one or more networks (e.g., network 130). One or more computing or other devices 102, 104, may be in communication with the dynamic requirements mapping computing platform 110 (e.g., via network 130). Memory 112 may include one or more program modules having instructions that when executed by processor(s) 111 cause the dynamic requirements mapping computing platform 110 to perform one or more functions described herein, and/or one or more databases 119 that may store and/or otherwise maintain information which may be used by such program modules and/or processor(s) 111. In some instances, the one or more program modules and/or databases may be stored by and/or maintained in different memory units of dynamic requirements mapping computing platform 110 and/or by different computer systems or devices that may form and/or otherwise make up the dynamic requirements mapping computing platform 110. In some arrangements, different features or processes performed may be performed by different sets of instructions, such that the processor may execute each desired set of instructions to perform different functions described herein.

Further, in some examples, the dynamic requirements mapping computing platform 110 may include one or more computing devices or be part of one or more other computing devices, such as computing device 102, 104, or the like. That is, the dynamic requirements mapping computing platform 110 may be a device separate from computing devices 102, 104, and the like, and connected to or in communication with one or more of those devices, or the dynamic requirements mapping computing platform 110 may be part of a same device as one or more of devices 102, 104, or the like.

Memory 112 may include an assessment aspect identification module 113. The assessment aspect identification module 113 may include hardware and/or software configured to perform various functions within the dynamic requirements mapping computing platform 110. For instance, the assessment aspect identification module 113 may receive data associated with one or more assessments (e.g., cybersecurity assessments, compliance assessments, and the like) from, for instance, an assessment processor 102. The assessment processor 102 may be one of various types of computing devices, such as a server, laptop computing device, desktop computing device, smart phone, cell phone, tablet computing device, or the like, configured to perform the specific functions described herein. The assessment processor 102 may be part of a same physical device as one or more features or components of the dynamic requirements mapping computing platform 110 or may be a separate device.

In some examples, the assessment processor 102 may receive a plurality of assessments and may process the assessments to determine one or more requirements of each assessment. For instance, the assessment processor 102 may receive a plurality of assessments and identify a plurality of requirements associated with questions to be answered, information, data or evidence to be associated with the requirement in order to respond, and the like. The assessments and identified requirements may be transmitted to the assessment aspect identification module 113.

The assessment aspect identification module 113 may, for each requirement, identify one or more aspects associated with the requirement. For instance, the assessment processor 102 may process or parse each requirement to determine one or more aspects, such as particular features of the requirement, a category of the requirement, a type of response needed for the requirement (e.g., answer to a question, data, evidence linked, or the like), a group or team associated with the requirement, a time period for which the requirement applies, and the like. Various other aspects of the requirements may be determined by the assessment aspect identification module 102 without departing from the invention.

The assessment aspect identification module 113 may then determine whether two or more requirements from two or more assessments should be considered "overlapping." For example, the assessment aspect identification module 113 may compare each requirement from each assessment with each requirement from each of the other assessments of the plurality of assessments to determine whether a threshold number of aspects of each requirement are the same or substantially the same. For instance, the assessment aspect identification module 113 may identify a first requirement of a first assessment and may extract the identified aspects of the first requirement. The assessment aspect identification module 113 may then compare the first requirement and extracted aspects to each requirement of each assessment of the plurality of assessments to determine whether a threshold number of aspects of the first requirement are the same as or substantially the same as aspects from one or more other requirements (e.g., at least a second requirement different from the first requirement).

In some examples, in an effort to reduce computing resources required to compare each requirement of each assessment to each requirement of each other assessment, and to efficiently identify requirements that are overlapping (e.g., have a minimum threshold number of aspects in common), each requirement may be assigned a category. The categories may, in some examples, be based on subject matter of the requirement, type of data needed to provide a response to the requirement, or the like. Accordingly, the assessment aspect identification module 113 may compare only requirements having a same category designation. This may reduce the amount of computing resources and time to identify overlapping requirements.

If two or more requirements are identified as overlapping, the assessment aspect identification module 113 may direct (e.g., may transmit an instruction that may cause) a requirement integration module 114 to integrate the two or more requirements identified as overlapping. The requirement integration module 114 may include hardware and/or software configured to perform various functions within the dynamic requirements mapping computing platform 110. For instance, the requirement integration module 114 may, as directed by and based on instructions received from the assessment aspect identification module 113, integrate the two or more requirements to form a single integrated requirement. The single, integrated requirement may exist and may be stored separately from the two or more requirements being integrated.

The requirement integration module 114 may also generate a unique identifier to associate with the integrated requirement and may associate the unique identifier with the integrated requirement. The unique identifier may be an alphanumeric code or string of characters configured to uniquely identify the integrated requirement. In some examples, the unique identifiers may be sequentially generated such that the integrated requirements may be sorted sequentially after being stored in the database 119. In some examples, a portion of the unique identifier may include data or other information identifying the one or more requirements that were integrated to form the integrated requirement and to which data should be mapped.

Upon generating the integrated requirement and associated unique identifier, the requirement integration module 114 may direct (e.g., transmit an instruction that may cause) a control assignment module 115 to assign a control to the integrated requirement. The control may be a system or portion of a system configured to provide data, evidence, and the like, for responding to the requirement. The integrated requirement may be associated with the control via the unique identifier of the integrated requirement.

The integrated requirement, unique identifier, and associated control may be stored in, for example, a database 119. The database 119 may store each integrated requirement, as well as the unique identifier associated therewith, the control associated with the integrated requirement. The database 119 may also store data or evidence received for responding to the integrated requirement.

Accordingly, upon activating an assessment (e.g., beginning the process of responding to the requirements of an assessment), the control may receive an instruction to capture particular data. The control may then transmit a request for the particular data to a user computing device, such as computing device 104. The requested information or data may be received via the user computing device 104 and transmitted to the dynamic requirements mapping computing platform 110. The control may then associate the received data with the integrated requirement (e.g., via the unique identifier) and the received data may be stored in the database 119. The control assignment module 115 may direct (e.g., transmit an instruction that may cause) a mapping module 116 to map the data to the two or more requirements forming the integrated requirement. For instance, the mapping module 116 may map the received data to the two or more requirements of the assessment processor 102. That is, the mapping module 116 may command the assessment processor 102 to distribute the received data to particular destinations (e.g., based on data from the unique identifier of the integrated requirement, from the control assignment module, or the like).

In some examples, a lookup table (stored in, for example, database 119) may be used to identify the requirements to which the data should be mapped. That is, the unique identifier from the data received may be extracted and matched to a unique identifier in a lookup table. The matching unique identifier in the lookup table may include identification of the two or more requirements integrated into the integrated requirement to which the data may be mapped. In some examples, each requirement may have a number, label, name, or other code that may be used to identify the requirements. The assessment processor 102 may then use the received data to populate the various fields of the assessment in order to generate a completed assessment.

Figure 2A:
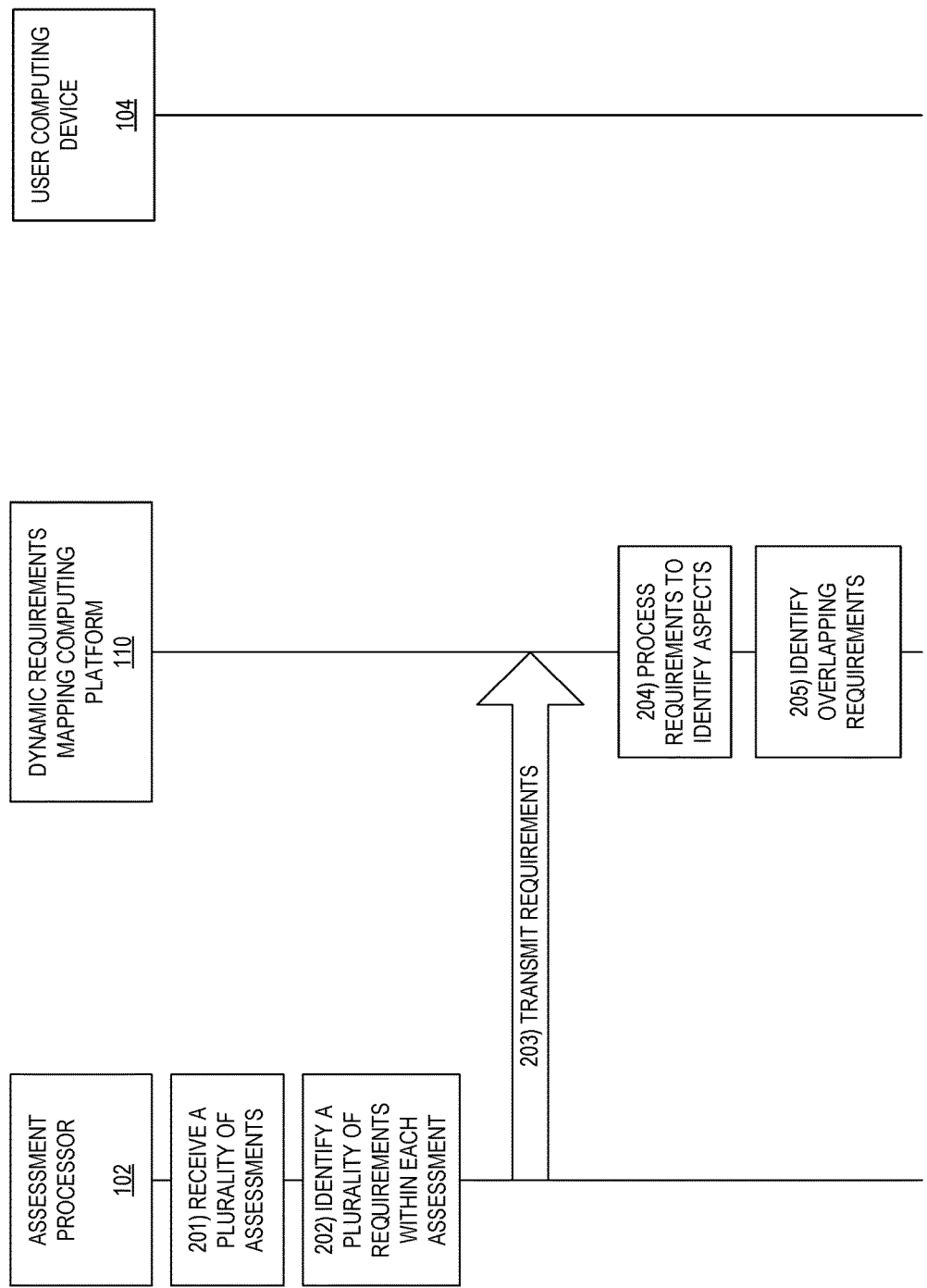
Figure 2C:
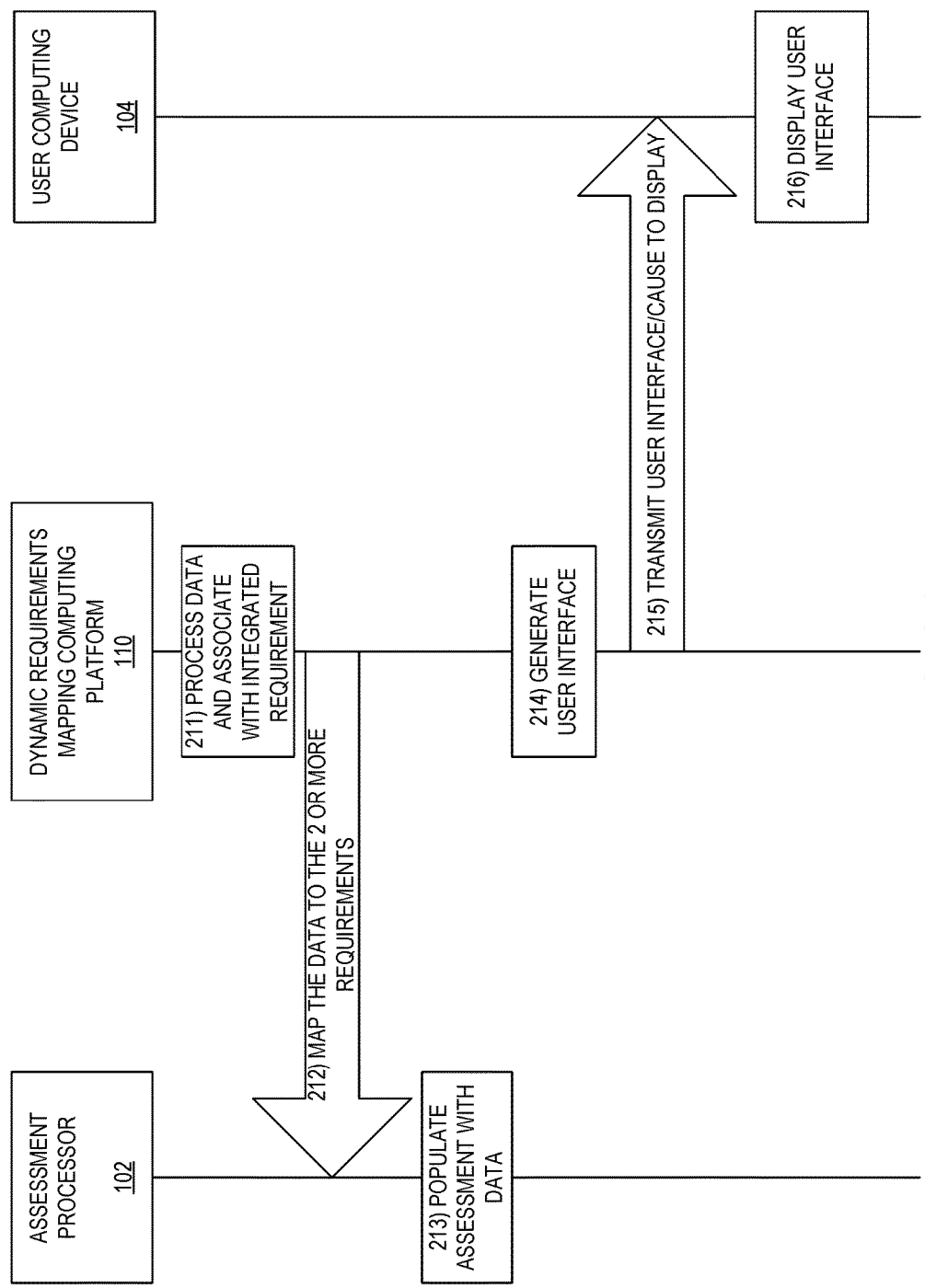

FIGS. 2A-2C illustrate one example event sequence for dynamic requirements mapping in accordance with one or more aspects described herein. The sequence illustrated in FIGS. 2A-2C is merely one example sequence and various other events may be included, or events shown may be omitted, without departing from the invention.

With reference to FIG. 2A, in step 201, a plurality of assessments may be received. For instance, a plurality of assessments may be received by, for example, an assessment processor 102. The assessments may include cybersecurity assessments, regulatory assessments, and the like, that each include a plurality of requirements (e.g., questions, requests for information or evidence, or the like) that must be completed in order to complete each assessment. In some examples, each assessment may have an open or active period. For instance, one or more assessments may have a requirement to be completed annually. Accordingly, the system may activate an assessment on a particular date and the assessment may be considered open (e.g., in the process of being completed). Upon completion of the assessment, the assessment may be locked and information provided in response to the requirements of that assessment might not be available for modification upon the assessment being locked.

In step 202, a plurality of requirements associated with each assessment may be identified. As mentioned above, each assessment may include a plurality of requirements that may be requests for information, requests for data or other evidence, or the like. In some examples, the assessments and associated requirements may be stored in the assessment processor 102 which may be a part of (e.g., a same physical device as) the dynamic requirements mapping computing platform 110 or may be a separate device. In some examples, each requirement may include an identifying code that may be an alphanumeric or other code which identifies the requirement.

In step 203, the requirements for each assessment (and associated codes) may be transmitted to the dynamic requirements mapping computing platform 110 (e.g., to the assessment aspect identification module 113). In step 204, the received requirements may be processed to identify a plurality of aspects associated with each requirement. For instance, aspects may include information such as type of requirement or category of requirement, type of response requested, type of evidence requested, subject matter of the requirement, and the like. In step 205, the dynamic requirements mapping computing platform 110 may evaluate the identified aspects of the requirements to identify two or more different requirements (e.g., requirements in different assessments) that are overlapping. In some examples, overlapping requirements may have at least a minimum threshold number of aspects in common (e.g., the same or substantially the same).

With reference to FIG. 2B, in step 206, the two or more requirements identified as overlapping may be integrated to generate an integrated requirement (e.g., combined into a single requirement). In some examples, the dynamic requirements mapping computing platform 110 may generate a unique identifier for the generated integrated requirement. For instance, the requirement integration module 114 may generate a unique identifier and the unique identifier may be associated with the integrated requirement. The unique identifier may be a numeric or alphanumeric code used to uniquely identify the integrated requirement. The associated unique identifier may be stored with the integrated requirement in a database (e.g., database 119). For instance, a data structure may be generated to store the integrated requirement (and other integrated requirements that may be generated using a similar process) and the associated unique identifier. In some examples, a unique identifier may be generated sequentially, such that integrated requirements may be sorted and addressed sequentially. The data structure may further store, in association with the integrated requirement, the requirements and/or associated codes that were integrated into that integrated requirement. Accordingly, when data is received, the data may be mapped to requirements stored in association with the integrated requirement.

In step 207, the integrated requirement may be associated with a control, such as a cybersecurity control. The control may be a system or portion of a system configured to provide data, evidence, and the like, for responding to the requirement. The integrated requirement may be associated with the control via the unique identifier of the integrated requirement.

In step 208, a request for data responsive to the integrated requirement may be transmitted to, for instance, a user device 104. In some examples, the control may identify the data to be requested and may transmit or cause the computing platform 110 to transmit the request for information. In step 209, the user device may receive the requested data, evidence, or the like and, in step 210, the received information may be transmitted to the dynamic requirements mapping computing platform 110. In some examples, the received data may include the unique identifier of the integrated requirement. In other examples, the control may associate the unique identifier with the received data upon receiving the data in response to a particular request. The control may associate the received information with the integrated requirement (e.g., via the unique identifier). The information may, in some examples, be stored in the data structure storing the integrated requirement and associated unique identifier.

With reference to FIG. 2C, in step 211, the data associated with the integrated requirement may be processed and, in step 212, the data may be mapped to the two or more requirements that were integrated to form the integrated requirement. For instance, the control may command or direct (e.g., transmit an instruction) the system to map the received data to the two or more requirements (e.g., stored in the assessment processor 102). Mapping the received data to the two or more requirements may, in some examples, include accessing a lookup table to match the unique identifier of the received data with a pre-stored unique identifier. Upon matching the unique identifier of the integrated requirement, the requirements and/or associated codes that were integrated into that integrated requirement may be retrieved.

In step 213, the two or more requirements identified from the unique identifier (e.g., of the two or more assessments) may be populated with the dynamically mapped data (if, for instance, the assessments are open and activated). The dynamically mapped data may be sufficient to complete those requirements for the associated assessments (e.g., the system may receive information in response to the integrated requirement (e.g., one response) and multiple requirements may be completed based on the received information being mapped to the requirements).

In step 214, a user interface may be generated. In some examples, the user interface may include data received in response to the request for information for the integrated requirement. The interface may further include requirements and/or assessments associated with or part of the integrated requirement. In some examples, the user interface may include information associated with a user who provided data in response to the request for information (e.g., in step 209), the data received, time and date the data was received, and the like.

In step 215, the user interface may be transmitted to the user computing device 104 and the dynamic requirements mapping computing platform 110 may cause or direct the user interface to be displayed on the user computing device 104. The interface may then be displayed in step 216.

The some or all of the steps or processes discussed with respect to FIGS. 2A-2C may be repeated to evaluate additional requirements, identify other overlapping requirements to be integrated, and the like.

Figure 3:
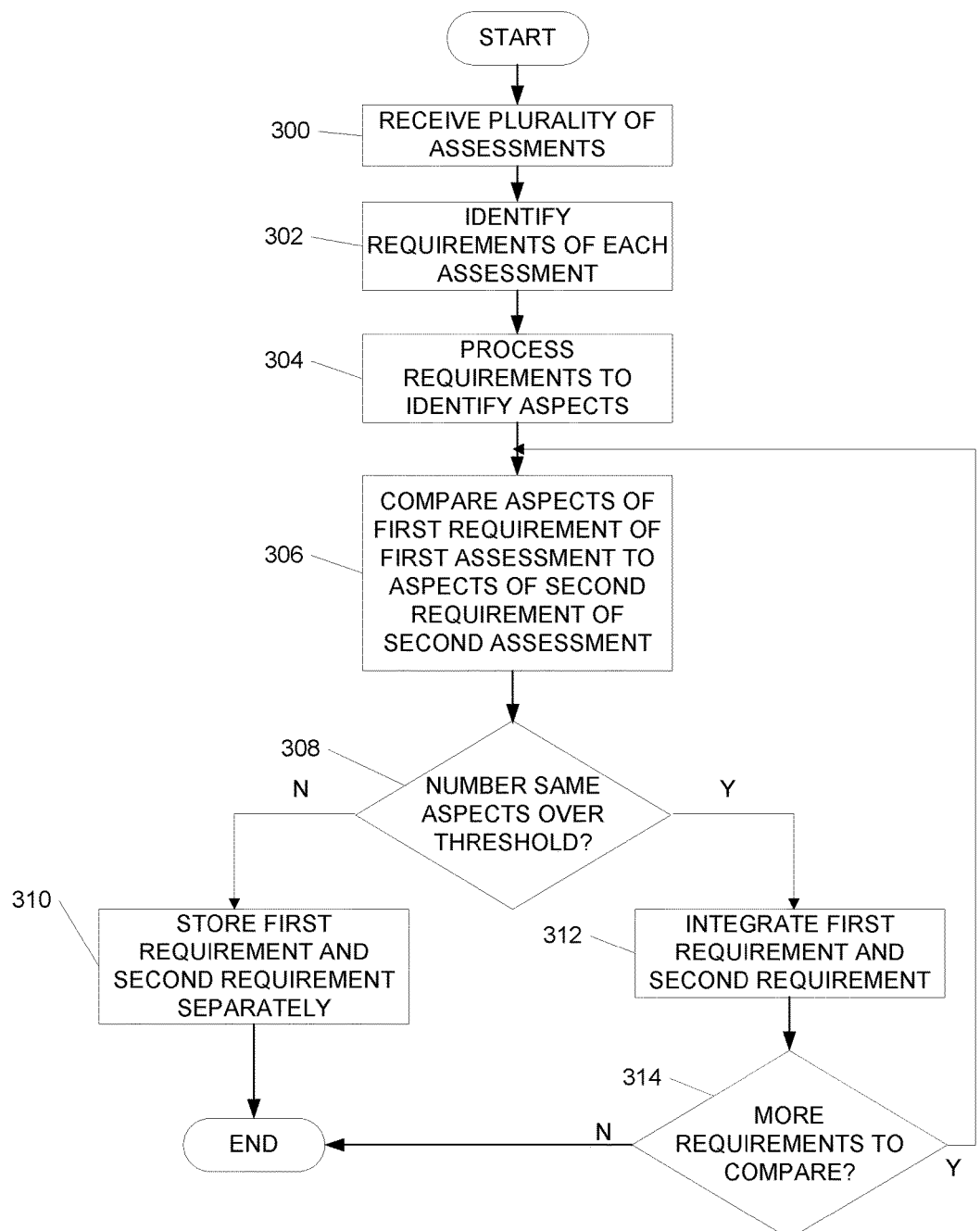
FIG. 3 depicts one example method of identifying requirements that may be considered overlapping and integrating those requirements according to one or more aspects described herein.

FIG. 3 illustrates one example method of identifying requirements that may be considered overlapping and integrating those requirements according to one or more aspects described herein. In step 300, a plurality of assessments may be received. As discussed herein, the plurality of assessments may include a variety of types of assessments and each assessment may include a plurality of requirements.

In step 302, a plurality of requirements for each assessment are identified. In step 304, each requirement is processed to identify one or more aspects associated with each requirement. In step 306, the aspects of a first requirement of a first assessment are compared to at least aspects of a second requirement of a second assessment, different from the first assessment (e.g., assessing a different subject matter, assessment requested by a different entity, or the like).

In step 308, a determination is made as to whether at least a threshold number of aspects of the first requirement are the same or substantially the same as aspects of the second requirement. If not, the first requirement and the second requirement may be stored separately (e.g., not integrated) in step 310.

If, in step 308, the number of aspects of the first requirement that are the same or substantially the same as aspects of the second requirement is over the threshold, the first requirement and second requirement may be integrated in step 312. In step 314, a determination is made as to whether additional requirements are available for evaluation/aspect comparison. If not, the process may end. If so, the process may return to step 306 to compare aspects of additional requirements (e.g., compare a second requirement of the first assessment to a third requirement of a third assessment, compare a third requirement to a fourth requirement of a fourth assessment and a fifth requirement of a fifth assessment, and the like).

Figure 4:
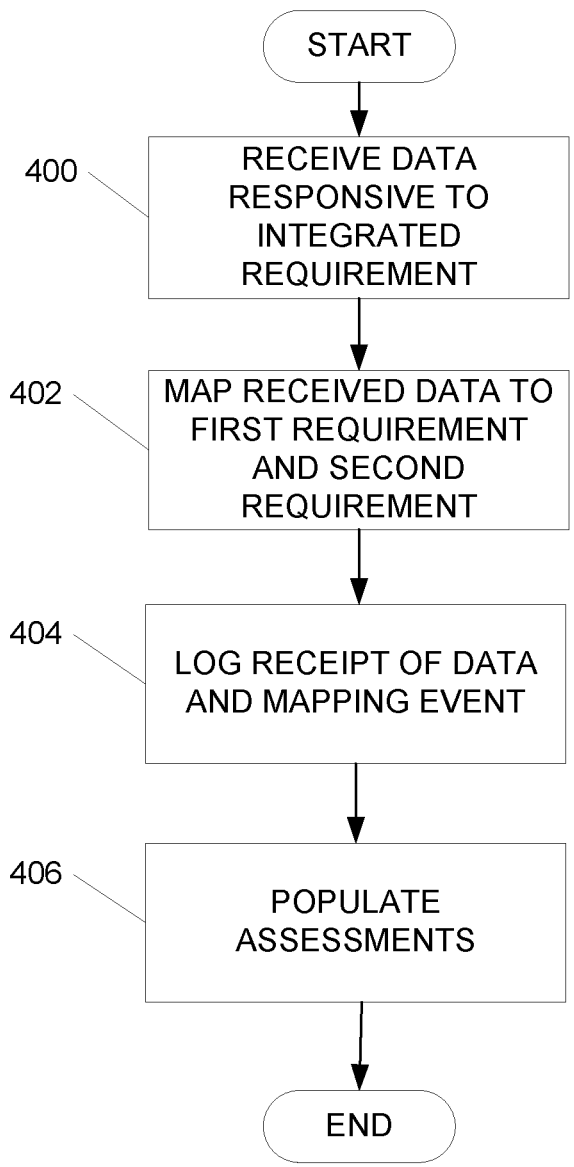
FIG. 4 illustrates another example method of dynamically mapping integrated requirement data according to one or more aspects described herein.

FIG. 4 illustrates one example method of dynamically mapping integrated requirement data according to one or more aspects described herein. In step 400, data responsive to an integrated requirement may be received. For instance, in response to a request for information received from the control associated with the integrated requirement, data may be received. The data may include responses to questions, evidence or other documents or data supporting a response to a requirement, and the like. The received data may be stored for instance in database 119 of the dynamic requirements mapping computing platform. The received data may include the unique identifier associated with the integrated requirement and may be stored according to the unique identifier.

In step 402, the received data may be mapped to the requirements that were integrated to form the integrated requirement. For instance, in continuing the example method from FIG. 3, a first requirement and a second requirement were integrated to form an integrated requirement. Accordingly, in step 402, data received in response to that integrated requirement will then be mapped to the first requirement and the second requirement.

In step 404, a log entry may be generated to log the entry of the data received in response to the integrated requirement, as well as the date and time the information was received. In some examples, the unique identifier of the integrated requirement may be logged, as well as the two or more requirements to which the received data was mapped. Accordingly, by logging information related to data received, modifications made, and the like, one or more reports may be generated providing an audit trail of how and when information was received, where it was mapped, and the like.

In step 406, the assessments associated with the first requirement and the second requirement may be populated with the data mapped to the first requirement and the second requirement. In some examples, mapping the data to the first requirement and the second requirement may include determining that the first assessment of the first requirement and the second assessment of the second requirement are activated. If so, the data may be mapped to the requirements and the assessments may be populated. If one or more assessments are locked, no changes may be made (e.g., the received data might not be populated in the locked assessment).

Figure 5:
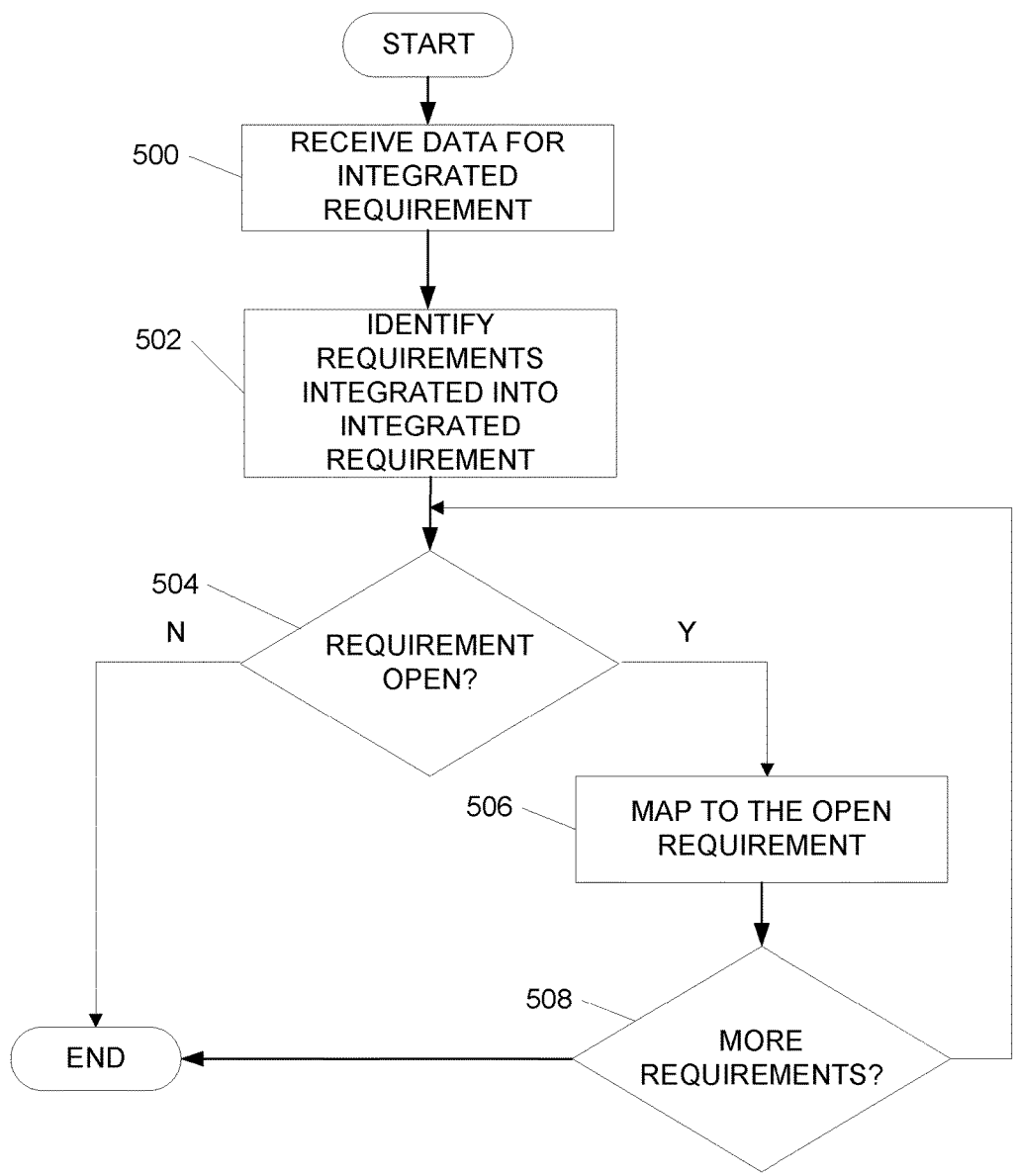
FIG. 5 illustrates another example method of dynamically mapping data to integrated requirements according to one or more aspects described herein.

FIG. 5 illustrates another example method of dynamically mapping data to integrated requirements according to one or more aspects described herein. In step 500, data may be received in response to a request for data for an integrated requirement. In step 502, the system may identify the two or more requirements integrated to generate the integrated requirement.

In step 504, a determination may be made on a first requirement of the two or more identified requirements integrated to generate the integrated requirement as to whether the requirement and/or assessment associated with the requirement is open and/or activated. If not, no data may be received for that assessment and the process may end.

If, in step 504, the requirement/assessment is open and/or activated, the data received may be mapped to that requirement in step 506. In step 508, a determination is made as to whether there are additional requirements to evaluate (e.g., whether there are remaining requirements of the two or more requirements integrated to generate the integrated requirement). If not, the process may end. If so, the process may return to step 504 to determine whether a next requirement/assessment is open and/or activated.

Figure 6:
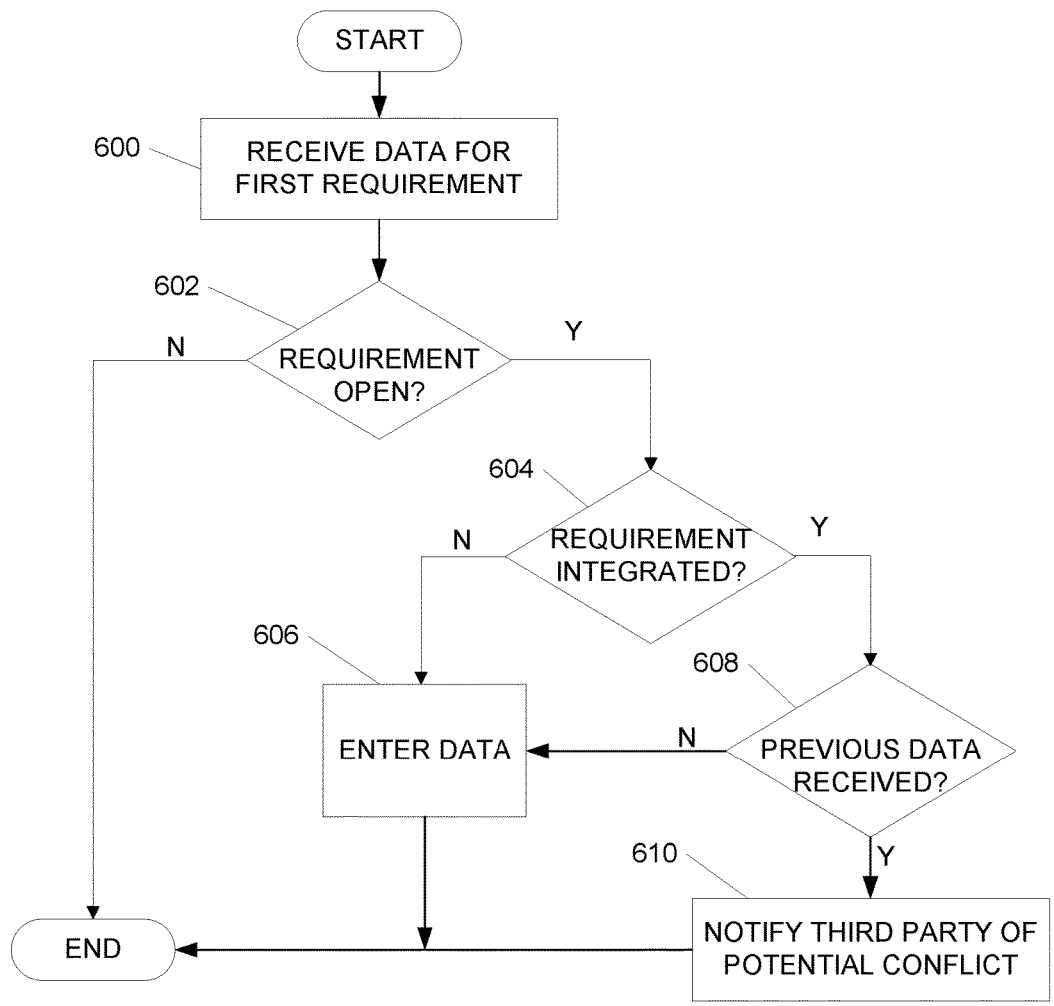
FIG. 6 illustrates one example method of rectifying conflicts that may be generated by data received from multiple sources in response to an integrated requirement in according to one or more aspects described herein.

FIG. 6 illustrates one example method of rectifying conflicts that may be generated by data received from multiple sources in response to an integrated requirement in accordance with one or more aspects described herein. In step 600, data may be received for a first requirement (e.g., rather than in response to a request for data for an integrated requirement). In step 602, a determination may be made as to whether the requirement and/or associated assessment are open and/or activated. If not, the process may end.

If, in step 602, the requirement and/or assessment are open and/or activated, a determination may be made in step 604 as to whether the first requirement is part of an integrated requirement. If not, the data may be entered into the first requirement in step 606.

If the first requirement is part of an integrated requirement in step 604, a determination may be made as to whether data was previously received for this requirement in step 608. For instance, the system may determine whether data was mapped to the first requirement based on data received in response to a request for information for an integrated requirement (e.g., the integrated requirement of the first requirement). If, in step 608, no data was previously received for this requirement, the data may be entered into the first requirement in step 606. In some examples, entering the data in step 606 may also enter the data into the integrated requirement. The data may then be mapped to other requirements integrated with the first requirement in the integrated requirement.

If, in step 608, previous data has been received, a notification may be generated and transmitted to a third party in step 610. The notification may include an indication of a potential conflict between information recently received and previously received information. The notification may include identification of the first requirement, the integrated requirement (e.g., the unique identifier of the integrated requirement), and the like. In some examples, the notification may be displayed on, for instance, the user computing device 104.

Figure 7:
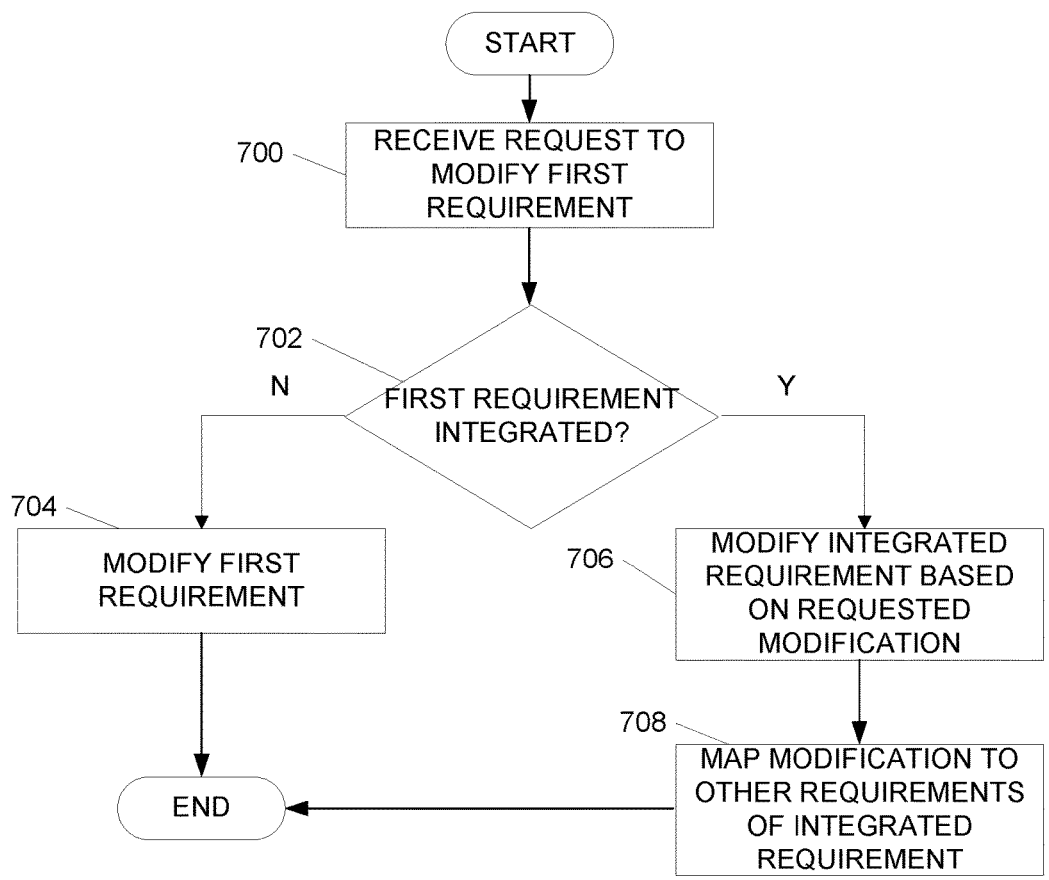
FIG. 7 illustrates one example method of modifying one or more requirements via an integrated requirement according to one or more aspects described herein.

FIG. 7 illustrates one example of modifying one or more requirements via an integrated requirement according to one or more aspects described herein. In step 700, a request to modify a first requirement may be received. In step 702, a determination may be made as to whether the first requirement is part of an integrated requirement. If not, the modification may be made to the integrated requirement in step 704.

If, in step 702, the first requirement is part of an integrated requirement, the integrated requirement may be modified based on the requested modification in step 706. In some examples, prior to modifying the integrated requirement, the system may confirm that a number of aspects of the first requirement matching or overlapping aspects of the other requirements in the integrated requirement are over the threshold (e.g., that the requested modification as not rendered the first requirement as no longer overlapping with the other requirements of the integrated requirement). In step 708, the modifications made to the integrated requirement may be mapped to each requirement integrated into the integrated requirement. Accordingly, if a change is desired, the change may be made to the integrated requirement and the modification will then be mapped out to any requirements integrated into the integrated requirement. In some examples, mapping the modification to the requirements may include the dynamic requirements mapping computing platform directing or commanding the assessment processor to modify the requirements based on the modification received.

FIG. 8 illustrates one example user interface providing information about an integrated requirement according to one or more aspects described herein. The user interface 800 may be generated by the dynamic requirements mapping computing platform 110 which may cause the user interface 800 to be displayed on a user computing device, such as device 104. The user interface 800 includes a field identifying the integrated requirement and including the unique identifier of the integrated requirement. In addition, the user interface 800 includes a listing of all requirements that have been integrated into the requirement. In some examples, the requirements listed may also include a name or identifier of an assessment associated with that requirement.

The user interface 800 further includes a date and time at which evidence was provided in response to the integrated requirement. An attachment field is also provided in which any attachments that were provided (e.g., uploaded) as evidence may be identified. The interface 800 may further include a field identifying one or more users who have provided the information in response to the integrated requirement. The users may be identified by name, employee number, or other unique identifier associated with the user.

As discussed herein, integrating requirements for various assessments may reduce the amount of time and/or computing resources needed to complete a plurality of assessments for an entity. In addition, the arrangements described herein ensure greater consistency in responses to requirements by mapping a single response to an integrated requirement to the plurality of requirements integrated into the integrated requirement. Further, by mapping any modifications to a requirement to an associated integrated requirement and other requirements integrated in the integrated requirement, the system ensures that updates are timely made and that consistency between requirements is maintained.

In addition, aspects described herein provide for greater control over modifications made to one or more requirements and provide a system for addressing any potential conflicts in data provided by generating a notification to a third party indicating a potential conflict. The arrangements discussed herein also permit logging for data provided, modifications made, and the like, to ensure that a clear record of changes is recorded. One or more reports may be generated showing the history of data received for a requirement, integrated requirement, modifications by a particular user, and the like.

Further, the systems and arrangements described herein may ensure that changes are not made to assessments that have been identified as completed and are therefore locked. For instance, the system may determine that a requirement (e.g., an integrated requirement, one or more requirements within an integrated requirement) are part of an assessment that is locked (e.g., either it is completed and has been locked or the assessment has not been activated yet). If so, the system might not map data to that requirement. Instead, in some examples, a notification may be generated indicating that an attempt to map data to a particular requirement or integrated requirement was made and failed because the assessment was locked.

Figure 9:
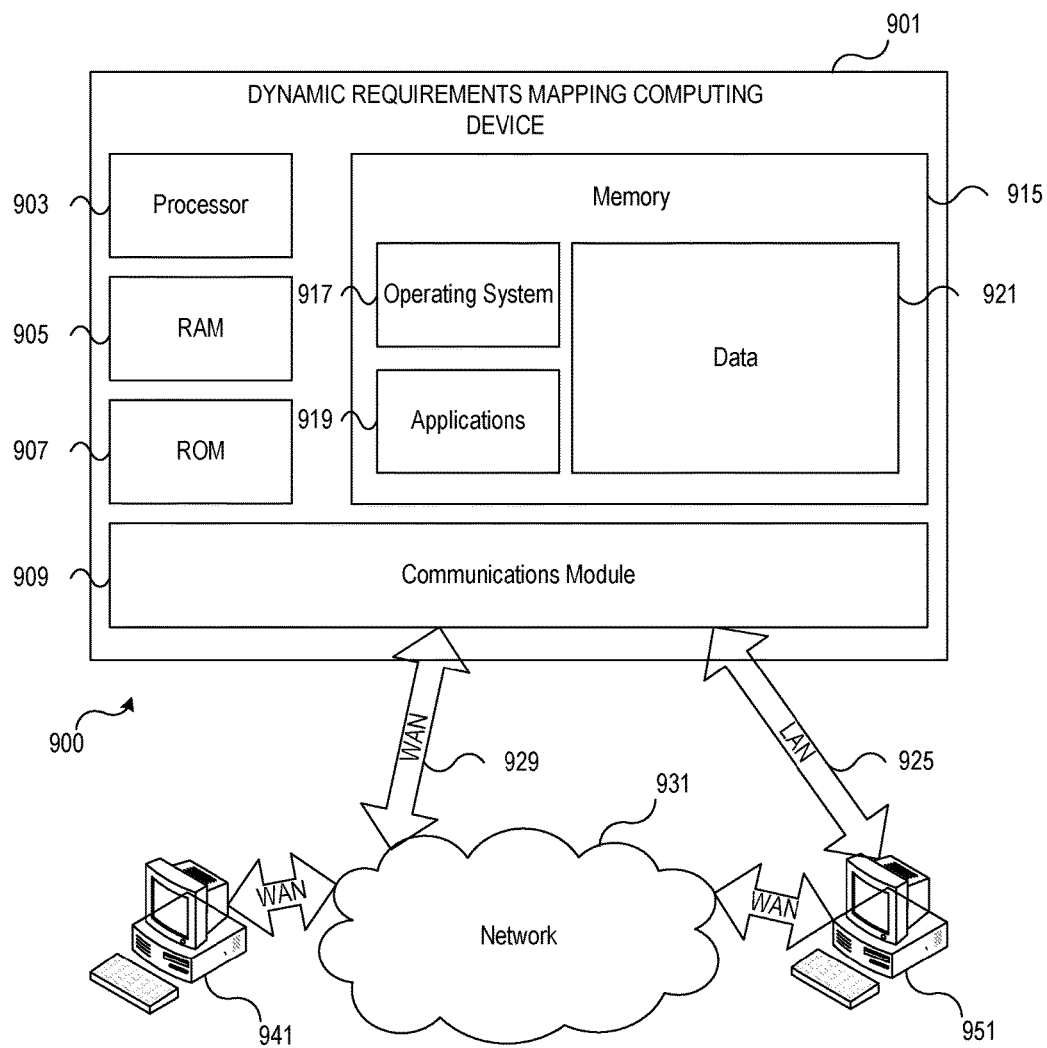
FIG. 9 illustrates one example operating environment in which various aspects of the disclosure may be implemented in accordance with one or more aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include dynamic requirements mapping computing device 901 having processor 903 for controlling overall operation of dynamic requirements mapping computing device 901 and its associated components, including random-access memory (RAM) 905, read-only memory (ROM) 907, communications module 909, and memory 915. Dynamic requirements mapping computing device 901 may include a variety of computer readable media. Computer readable media may be any available media that may be accessed by dynamic requirements mapping computing device 901, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 901.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic requirements mapping computing device 901. Such a processor may execute computer-executable instructions stored on a computer-readable medium.

Software may be stored within memory 915 and/or storage to provide instructions to processor 903 for enabling dynamic requirements mapping computing device 901 to perform various functions. For example, memory 915 may store software used by dynamic requirements mapping computing device 901, such as operating system 917, application programs 919, and associated database 921. Also, some or all of the computer executable instructions for dynamic requirements mapping computing device 901 may be embodied in hardware or firmware. Although not shown, RAM 905 may include one or more applications representing the application data stored in RAM 905 while dynamic requirements mapping computing device 901 is on and corresponding software applications (e.g., software tasks) are running on dynamic requirements mapping computing device 901.

Communications module 909 may include a microphone, keypad, touch screen, and/or stylus through which a user of dynamic requirements mapping computing device 901 may provide input, and may also include one or more of a speaker for providing audio output and a video display device for providing textual, audiovisual and/or graphical output.

Computing system environment 900 may also include optical scanners (not shown). Exemplary usages include scanning and converting paper documents, e.g., correspondence, receipts, and the like, to digital files.

Dynamic requirements mapping computing device 901 may operate in a networked environment supporting connections to one or more remote computing devices, such as computing devices 941 and 951. Computing devices 941 and 951 may be personal computing devices or servers that include any or all of the elements described above relative to dynamic requirements mapping computing device 901.

The network connections depicted in FIG. 9 may include local area network (LAN) 925 and wide area network (WAN) 929, as well as other networks. When used in a LAN networking environment, dynamic requirements mapping computing device 901 may be connected to LAN 925 through a network interface or adapter in communications module 909. When used in a WAN networking environment, dynamic requirements mapping computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 10:
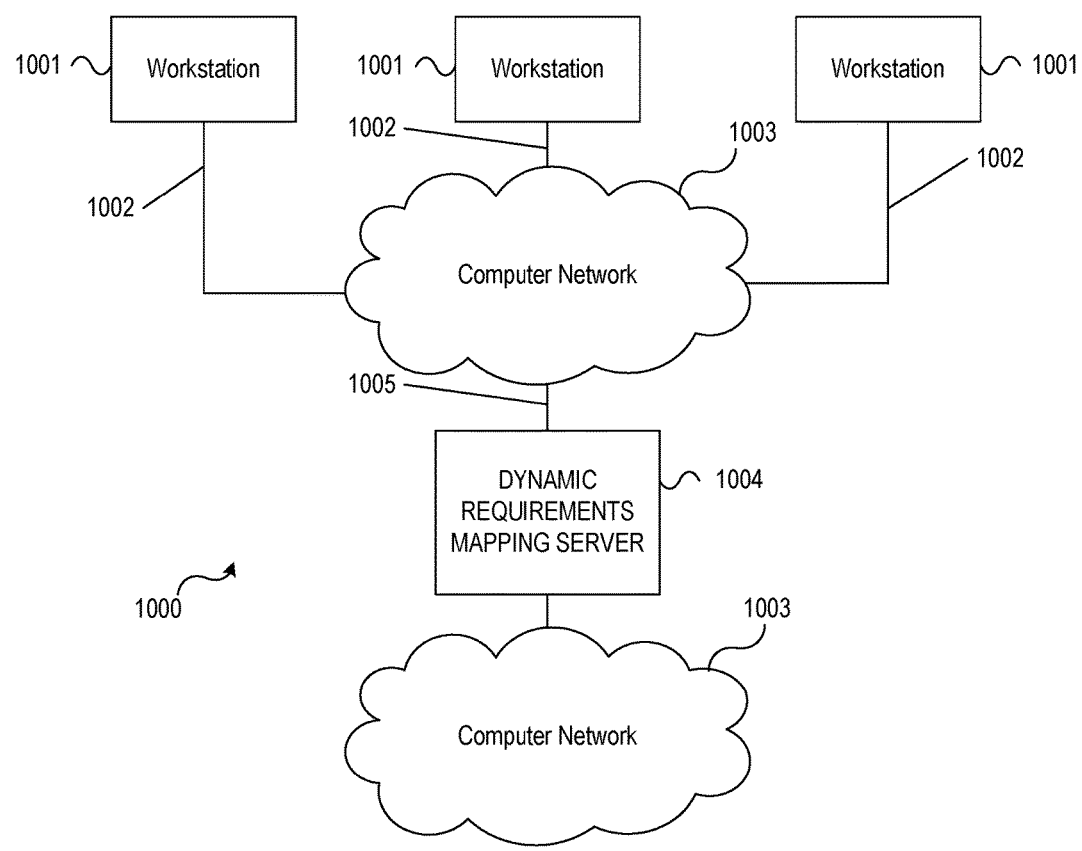
FIG. 10 depicts an illustrative block diagram of workstations and servers that may be used to implement the processes and functions of certain aspects of the present disclosure in accordance with one or more aspects described herein.

FIG. 10 depicts an illustrative block diagram of workstations and servers that may be used to implement the processes and functions of certain aspects of the present disclosure in accordance with one or more example embodiments. Referring to FIG. 10, illustrative system 1000 may be used for implementing example embodiments according to the present disclosure. As illustrated, system 1000 may include one or more workstation computers 1001. Workstation 1001 may be, for example, a desktop computer, a smartphone, a wireless device, a tablet computer, a laptop computer, and the like, configured to perform various processes described herein. Workstations 1001 may be local or remote, and may be connected by one of communications links 1002 to computer network 1003 that is linked via communications link 1005 to dynamic requirements mapping server 1004. In system 1000, dynamic requirements mapping server 1004 may be any suitable server, processor, computer, or data processing device, or combination of the same, configured to perform the functions and/or processes described herein. Server 1004 may be used to process the instructions received from one or more devices, integrate requirements, generate identifiers, and the like.

Computer network 1003 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1002 and 1005 may be any communications links suitable for communicating between workstations 1001 and dynamic requirements mapping server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing platform may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A dynamic requirements mapping computing platform, comprising:
   at least one processor;
   a communication interface communicatively coupled to the at least one processor; and
   at least one memory storing computer-readable instructions that, when executed by the at least one processor, cause the dynamic requirements mapping computing platform to:
      receive a plurality of assessments, each assessment including a plurality of requirements and each requirement including a request for information;
      analyze the plurality of assessments to identify a first requirement of a first assessment of the plurality of assessment that overlaps with at least a second requirement of a second assessment of the plurality of assessments, the second assessment being different from the first assessment, the first requirement overlapping with at least the second requirement when the first requirement includes aspects that are the same as aspects of the at least the second requirement of the second assessment;
      integrate the first requirement and the second requirement into an integrated requirement;
      generate a database structure storing the integrated requirement;
      assign the integrated requirement to a cybersecurity control and store the cybersecurity control assignment with the integrated requirement in the database structure;
      receiving, from the cybersecurity control, data associated with the integrated requirement;
      linking the received data associated with the integrated requirement to the integrated requirement;
      mapping the received data associated with the integrated requirement to the first requirement and the second requirement;
      receive, from the cybersecurity control, a request to modify the first requirement;
      determine whether the first requirement is part of an integrated requirement;
      responsive to determining that the first requirement is part of an integrated requirement:
         automatically modifying the integrated requirement based on the modification of the first requirement; and
         mapping the modification to the integrated requirement to the first requirement and the second requirement; and
      responsive to determining that the first requirement is not part of an integrated requirement, modifying the first requirement.

2. The dynamic requirements mapping computing platform of claim 1, wherein analyzing the plurality of assessments to identify the first requirement of the first assessment of the plurality of assessments that overlaps with the at least the second requirement of the second assessment of the plurality of assessments further includes:
   identifying a plurality of aspects of the first requirement and the second requirement;
   comparing the identified aspects to determine whether at least a threshold number of aspects of the first requirement are the same as aspects of the second requirement; and
   responsive to determining that at least a threshold number of aspects of the first requirement are the same as aspects of the second requirement, identifying the first requirement as overlapping with the second requirement.

3. The dynamic requirements mapping computing platform of claim 1, further including instructions that, when executed, cause the dynamic requirements mapping computing platform to:
   generate a user interface configured to display integrated requirements and associated data.

4. The dynamic requirements mapping computing platform of claim 1, further including instructions that, when executed, cause the dynamic requirements mapping computing platform to:
   receive data responsive to the first requirement;
   determine whether the first requirement and associated first assessment are activated;
   responsive to determining that the first requirement and associated first assessment are activated, determining whether the first requirement is part of an integrated requirement;
   responsive to determining that the first requirement is part of an integrated requirement, determining whether data was previously received for the first requirement;
   responsive to determining that data was previously received for the first requirement, generating a notification to a third party identifying a potential conflict; and
   transmitting the notification to the third party.

5. The dynamic requirements mapping computing platform of claim 1, wherein integrating the first requirement and the second requirement into an integrated requirement further includes generating a unique identifier associated with the integrated requirement.

6. A method, comprising:
   receiving, by an assessment processor, a plurality of assessments, each assessment including a plurality of requirements and each requirement including a request for information;
   identifying, by the assessment processor, a plurality of requirements of each assessment of the plurality of assessment;
   transmitting the received assessments and identified requirements to a dynamic requirements mapping computing platform;
   analyzing, by the dynamic requirements mapping computing platform, the plurality of assessments and the plurality of requirements to identify a first requirement of a first assessment of the plurality of assessments that overlaps with at least a second requirement of a second assessment of the plurality of assessments, the second assessment being different from the first assessment, the first requirement overlapping with at least the second requirement when the first requirement includes aspects that are the same as aspects of the at least the second requirement of the second assessment;

integrating, by the dynamic requirements mapping computing platform, the first requirement and the second requirement into an integrated requirement;
generating, by the dynamic requirements mapping computing platform, a database structure storing the integrated requirement;
assigning, by the dynamic requirements mapping computing platform, the integrated requirement to a cybersecurity control and store the cybersecurity control assignment with the integrated requirement in the database structure;
receiving, by the dynamic requirements mapping computing platform and from the cybersecurity control, data associated with the integrated requirement;
linking, by the dynamic requirements mapping computing platform, the received data associated with the integrated requirement to the integrated requirement;
mapping, by the dynamic requirements mapping computing platform, the received data associated with the integrated requirement to the first requirement and the second requirement;
receiving, by the dynamic requirements mapping computing platform and from the cybersecurity control, a request to modify the first requirement;
determining, by the dynamic requirements mapping computing platform, whether the first requirement is part of an integrated requirement;
if it is determined that the first requirement is part of an integrated requirement:
automatically modifying, by the dynamic requirements mapping computing platform, the integrated requirement based on the modification of the first requirement; and
mapping, by the dynamic requirements mapping computing platform, the modification to the integrated requirement to the first requirement and the second requirement; and
if it is determined that the first requirement is not part of an integrated requirement, modifying the first requirement.

7. The method of claim 6, wherein analyzing the plurality of assessments to identify the first requirement of the first assessment of the plurality of assessments that overlaps with the at least the second requirement of the second assessment of the plurality of assessments further includes:
identifying, by the dynamic requirements mapping computing platform, a plurality of aspects of the first requirement and the second requirement;
comparing, by the dynamic requirements mapping computing platform, the identified aspects to determine whether at least a threshold number of aspects of the first requirement are the same as aspects of the second requirement; and
responsive to determining that at least a threshold number of aspects of the first requirement are the same as aspects of the second requirement, identifying, by the dynamic requirements mapping computing platform, the first requirement as overlapping with the second requirement.

8. The method of claim 6, further including:
generating, by the dynamic requirements mapping computing platform, a user interface configured to display integrated requirements and associated data.

9. The method of claim 6, further including:
receiving, by the dynamic requirements mapping computing platform, data responsive to the first requirement;
determining, by the dynamic requirements mapping computing platform, whether the first requirement and associated first assessment are activated;
responsive to determining that the first requirement and associated first assessment are activated, determining, by the dynamic requirements mapping computing platform, whether the first requirement is part of an integrated requirement;
responsive to determining that the first requirement is part of an integrated requirement, determining, by the dynamic requirements mapping computing platform, whether data was previously received for the first requirement;
responsive to determining that data was previously received for the first requirement, generating, by the dynamic requirements mapping computing platform, a notification to a third party identifying a potential conflict; and
transmitting, by the dynamic requirements mapping computing platform, the notification to the third party.

10. The method of claim 6, wherein integrating the first requirement and the second requirement into an integrated requirement further includes generating a unique identifier associated with the integrated requirement.

11. One or more non-transitory computer-readable media storing instructions that, when executed by a dynamic requirements mapping computer system comprising at least one processor, memory, and a communication interface, cause the dynamic requirements mapping computer system to:
receive a plurality of assessments, each assessment including a plurality of requirements and each requirement including a request for information;
analyze the plurality of assessments to identify a first requirement of a first assessment of the plurality of assessment that overlaps with at least a second requirement of a second assessment of the plurality of assessments, the second assessment being different from the first assessment, the first requirement overlapping with at least the second requirement when the first requirement includes aspects that are substantially the same as aspect of the at least the second requirement of the second assessment;
integrate the first requirement and the second requirement into an integrated requirement;
generate a database structure storing the integrated requirement;
assign the integrated requirement to a cybersecurity control and store the cybersecurity control assignment with the integrated requirement in the database structure;
receive, from the cybersecurity control, data associated with the integrated requirement;
link the received data associated with the integrated requirement to the integrated requirement;
map the received data associated with the integrated requirement to the first requirement and the second requirement;
receive, from the cybersecurity control, a request to modify the first requirement;
determine whether the first requirement is part of an integrated requirement;
responsive to determining that the first requirement is part of an integrated requirement:
automatically modifying the integrated requirement based on the modification of the first requirement; and mapping the modification to the integrated requirement to the first requirement and the second requirement; and responsive to determining that the first requirement is not part of an integrated requirement, modifying the first requirement.

12. The one or more non-transitory computer-readable media of claim 11, wherein analyzing the plurality of assessments to identify the first requirement of the first assessment of the plurality of assessments that overlaps with the at least the second requirement of the second assessment of the plurality of assessments further includes:

identifying a plurality of aspects of the first requirement and the second requirement;

comparing the identified aspects to determine whether at least a threshold number of aspects of the first requirement are the same as aspects of the second requirement; and responsive to determining that at least a threshold number of aspects of the first requirement are the same as aspects of the second requirement, identifying the first requirement as overlapping with the second requirement.

13. The one or more non-transitory computer-readable media of claim 11, further including instructions that, when executed, cause the dynamic requirements mapping computing system to:

generate a user interface configured to display integrated requirements and associated data.

14. The one or more non-transitory computer-readable media of claim 11, further including instructions that, when executed, cause the dynamic requirements mapping computing system to:

receive data responsive to the first requirement;

determine whether the first requirement and associated first assessment are activated;

responsive to determining that the first requirement and associated first assessment are activated, determining whether the first requirement is part of an integrated requirement;

responsive to determining that the first requirement is part of an integrated requirement, determining whether data was previously received for the first requirement;

responsive to determining that data was previously received for the first requirement, generating a notification to a third party identifying a potential conflict; and transmitting the notification to the third party.

15. The one or more non-transitory computer-readable media of claim 11, wherein integrating the first requirement and the second requirement into an integrated requirement further includes generating a unique identifier associated with the integrated requirement.

* * * * *